April 27, 1943. W. C. HUEBNER 2,317,612
CAMERA
Filed March 25, 1940 13 Sheets-Sheet 1

April 27, 1943.    W. C. HUEBNER    2,317,612
CAMERA
Filed March 25, 1940    13 Sheets-Sheet 2

INVENTOR
William C. Huebner
By Joseph Harris
ATTORNEY

April 27, 1943.    W. C. HUEBNER    2,317,612
CAMERA
Filed March 25, 1940    13 Sheets-Sheet 4

INVENTOR.
William C. Huebner
BY Joseph Harris
ATTORNEYS.

April 27, 1943.   W. C. HUEBNER   2,317,612
CAMERA
Filed March 25, 1940    13 Sheets-Sheet 5

FIG_8_

FIG_9_

INVENTOR.
William C. Huebner
BY
Joseph Harris
ATTORNEYS.

April 27, 1943.  W. C. HUEBNER  2,317,612
CAMERA
Filed March 25, 1940    13 Sheets-Sheet 6

INVENTOR.
William C. Huebner
BY Joseph Harris
ATTORNEYS.

April 27, 1943. W. C. HUEBNER 2,317,612
CAMERA
Filed March 25, 1940 13 Sheets-Sheet 7

INVENTOR.
William C. Huebner
BY Joseph Harris
ATTORNEYS.

April 27, 1943.   W. C. HUEBNER   2,317,612
CAMERA
Filed March 25, 1940   13 Sheets-Sheet 8

INVENTOR.
BY William C. Huebner
Joseph Harris
ATTORNEYS.

April 27, 1943.    W. C. HUEBNER    2,317,612
CAMERA
Filed March 25, 1940    13 Sheets-Sheet 10

INVENTOR
William C. Huebner
BY Joseph Harris
ATTORNEY

April 27, 1943. W. C. HUEBNER 2,317,612
CAMERA
Filed March 25, 1940 13 Sheets-Sheet 11

FIG_25_

FIG_27_

FIG_29_

FIG_26_

FIG_28_

FIG_30_

FIG_31_

INVENTOR
William C. Huebner
By Joseph Harris
ATTORNEY

April 27, 1943. W. C. HUEBNER 2,317,612
CAMERA
Filed March 25, 1940 13 Sheets-Sheet 12

INVENTOR
William C. Huebner
By Joseph Harris
ATTORNEY

April 27, 1943.　　W. C. HUEBNER　　2,317,612
CAMERA
Filed March 25, 1940　　13 Sheets-Sheet 13

INVENTOR
William C. Huebner
By Joseph Harris
ATTORNEY

Patented Apr. 27, 1943

2,317,612

UNITED STATES PATENT OFFICE 2,317,612

CAMERA

William C. Huebner, New York, N. Y.

Application March 25, 1940, Serial No. 325,695

5 Claims. (Cl. 95—2)

This invention relates to improvements in cameras and, more specifically, to cameras for use in color photography.

In direct photographic color cameras heretofore used, particularly in connection with photomechanical reproduction printing processes, it has been the general practice to employ three, color separation plates and then reproduce impressions of the colored object by either the substractive or additive process. In such photomechanical reproduction processes, as well as in other color photo reproduction methods, experience with color pigments used in connection therewith, has proven that three color combinations are not satisfactory in obtaining true reproductions. This is particularly true with reference to the reproduction of the grays or shadows which are always present and frequently predominant. Theoretically, these grays or shadows can be reproduced by a proper balancing of the three primary colors, yellow, red and blue, but, practically, due to the numerous variables in the dyes or pigments, satisfactory faithful color reproduction cannot be obtained in photomechanical processes without the use of a fourth black, gray or neutral plate.

One object of this invention, therefore, is to provide a camera which, while adapted for all kinds of color photography in general, is particularly useful in connection with photomechanical reproduction processes in that the organization of the camera is such, it provides for photographing colors directly from the object, in a single exposure onto one plate or other light sensitive medium and separating four or more or less, different colors of a fixed relationship to each other upon distinct different portions of the sensitized element.

Another object of the invention having particular application to the art of photomechanical reproduction processes, is to provide a color camera such that the reproduction of the colored object, may be obtained by photomechanical methods of printing from the original single negative carrying the four color-separated records, thereby eliminating those steps heretofore required of producing a second set of separation negatives from the usual final full color transparency positive, as well known to those skilled in the art.

In its broader aspects, the improved camera comprises, in addition to suitable supporting and housing means, an optical system for producing a multiple of images of the object being photographed; multiple color filter means; multiple diaphragm-controlled lenses; and means for supporting a light sensitive element such as a plate, film or roll and on which the multiple image records are light impressed.

A further object of the invention is to provide, in a color camera of the general organization set forth in the preceding paragraph, means for readily selectively interchanging any set or combination of color filters for any other set or combination of color filters to the end that the most suitable combination of color filters may be used for any given purpose such as indoor or outdoor photography, warm lighting or cold lighting, and for any particular kind of color sensitive plate or film or the like.

Still another object of the invention is to provide, in a color camera of the type indicated, means for practically instantaneously interchanging any set of lenses for a different set whereby lenses of different focal lengths can be employed and the operator thereby permitted to employ lenses best adapted for any particular job.

Another object of the invention, in connection with the lens system, is to provide for quick individual diaphragm setting of each lens for each color in order that the amounts of light passing through the several color filters and corresponding lenses to the sensitized surface, can be accurately adjusted to balance one with the other to thereby control all of the color values simultaneously impressed upon the one sensitized surface and thus insure finer quality of reproduction.

An additional object of the invention is to provide, in a color camera of the general type indicated, attachments or accessories such that, after a plate has been exposed, developed, dried and then re-inserted in the camera, the several color-separated images may be projected through a different but complemental set of color filters and all the images reassembled in focus into one registered complete color image on a ground glass or the like, thus enabling the operator to ascertain practically immediately, the quality of the work.

Other objects of the invention are: to provide a camera of the character indicated in which glass plates, films or rolls of film may be used; to provide a color camera which is compact; of relatively light total weight and of such rugged and sturdy construction that the relationships of all of the elements of the camera will remain intact under all normal conditions of use to thereby insure results free from distortion, misregister or other defects.

Other objects of the invention will more clearly appear from the description and claims hereinafter following.

In the drawings forming a part of this specification.

In said drawings, the improved camera is shown as mounted on a tripod A of conventional form, having a top platform $a$. The improved camera proper, comprises, broadly, a horizontal main or bottom support or platform 40; what may be termed a housing 41; a second housing 42 for the sensitized element and a bellows 43 connected at its ends to the two housings 41 and 42.

The main housing 41, which is disposed at the front or incident end of the camera is preferably of rectangular box-like form, having upper wall 44, bottom wall 45 and side walls 46 and 47. As will be understood, the housing 41 is rigidly secured to the platform 40 and through the latter, the camera is adapted to be detachably secured to the platform $a$ of the tripod by any suitable means, such as the thumb screws 48—48.

Figure 1:
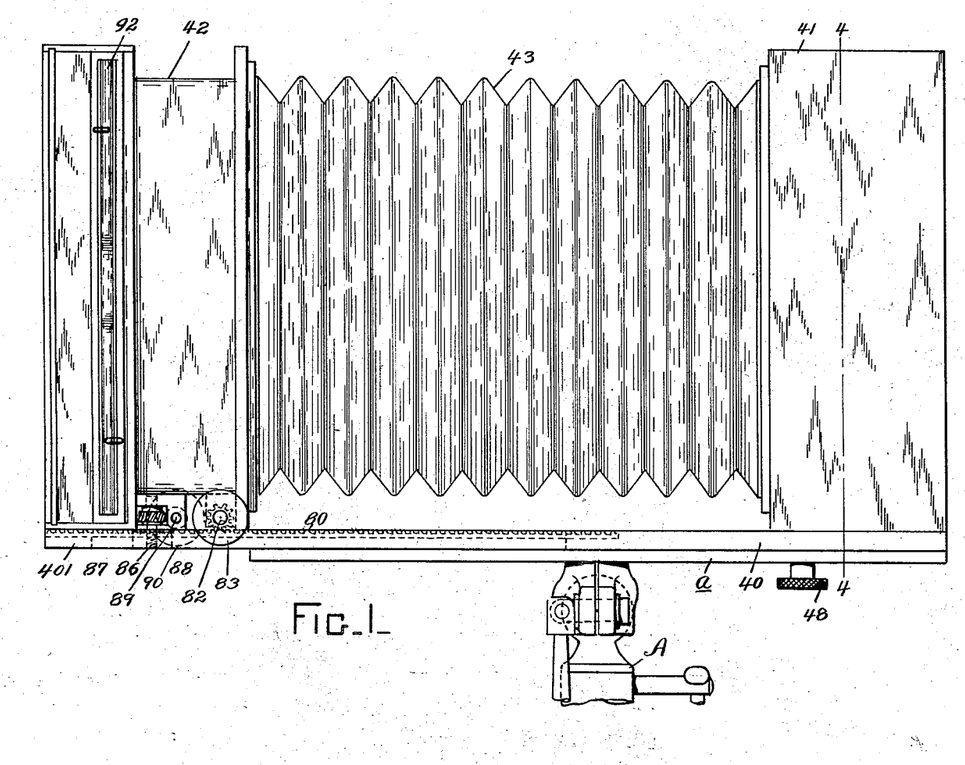
Figure 1 is a side elevation of a camera having the improvements embodied therein.
Figure 2:
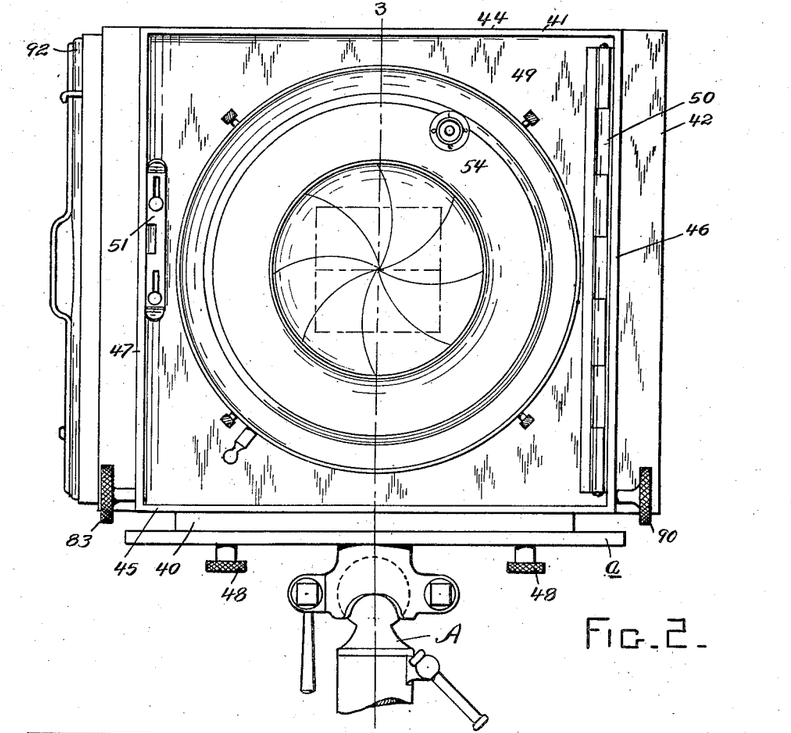
Figure 2 is a front elevation of the camera shown in Figure 1.
Figure 3:
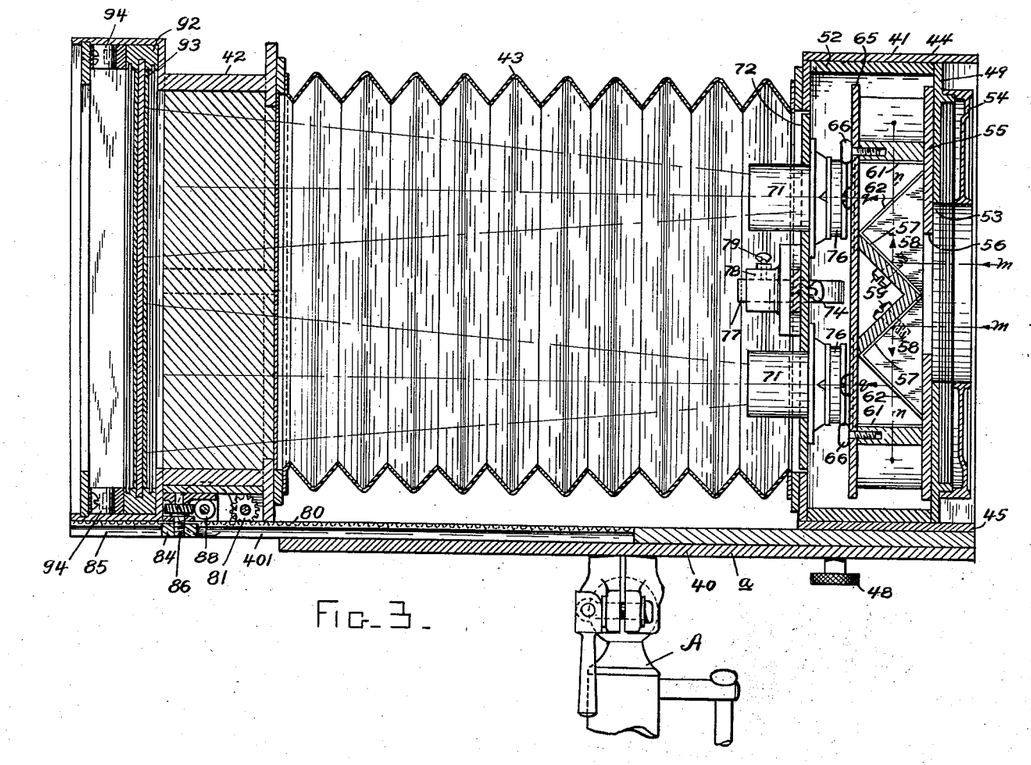
Figure 3 is a vertical longitudinal sectional view corresponding substantially to the line 3—3 of Figure 2.
Figure 4:
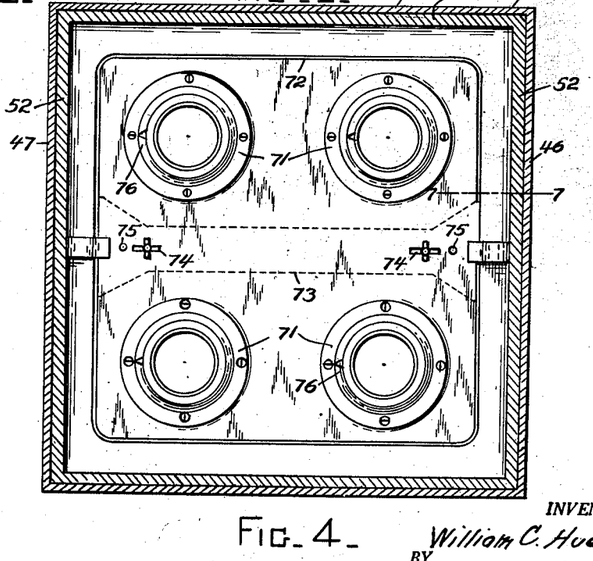
Figure 4 is a vertical transverse sectional view corresponding substantially to the line 4—4 of Figure 1.
Figures 5, 6, 7:
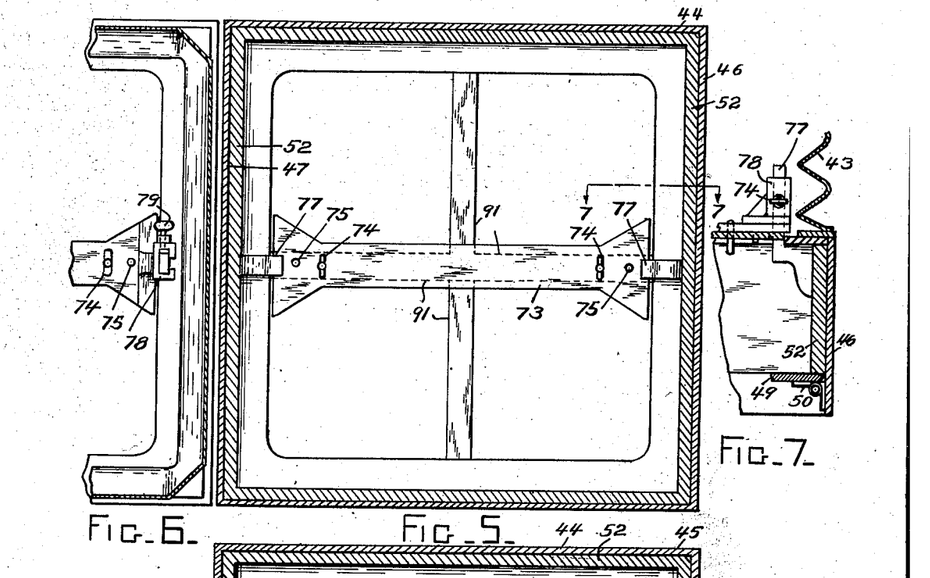
Figure 5 is a view similar to Figure 4, but with the lens plate or panel removed.
Figure 6 is a broken, vertical sectional view similar to Figure 5, but looking from the reverse side thereof.
Figure 7 is a horizontal detail, sectional view, corresponding to the section line 7—7 of Figure 5.

The housing 41 is additionally provided with a front wall or partition 49 which is hinged along one of its vertical edges, as indicated at 50, to the side wall 46 of said housing, said wall or partition 49 being adapted to be locked in closed and sealed position within the housing by a suitable slide latch 51. When in closed position, the front wall 49 seats against an interior rectangular, reinforcing shell 52 within the outer wall structure of the housing 41, as best shown in Figures 3, 4 and 5. Said front wall 49 is provided with a central circular light admitting opening or aperture 53 and to the outer side of said wall 49 is secured a diaphragm and shutter of suitable design and illustrated conventionally at 54. As will be understood, the diaphragm and shutter are adapted to be adjusted and manipulated in the usual manner for regulating the effective size of the light admitting aperture and shutting off and opening up the aperture for exposure purposes.

Figure 11:
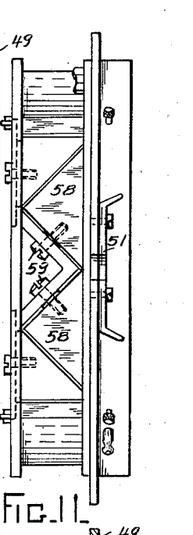
Figure 11 is a side elevational view of the structure shown in Figure 10.
Figure 12:
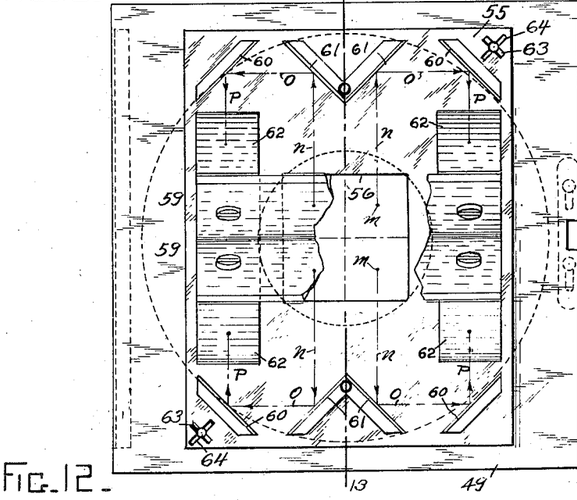
Figure 12 is a view similar to Figure 10, but with the filter color plate or panel removed, parts of the optical system in Figure 12 being broken away.
Figure 13:
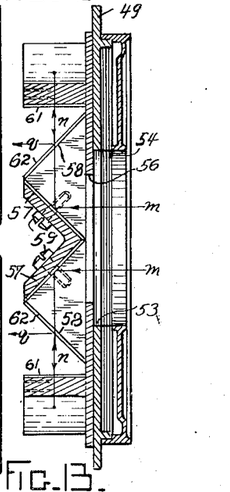
Figure 13 is a vertical, sectional view, corresponding to the line 13—13 of Figure 12.

Detachably secured to the inner face of the pivoted front wall 49 is the optical system for receiving the images of the object to be photographed and reflecting or dispersing the images into the desired number of separated images for color separation purposes. Said optical system as shown, comprises a rectangular plate or panel 55, having a central light admitting aperture 56 and a plurality of reflecting mirrors. The incident beam mirrors are two in number, as indicated at 57—57, the same being disposed at exactly 90° to each other as shown in Figures 11 and 12, and with their apex extending horizontally in the form illustrated. Said mirrors 57 are secured to suitable triangular supports 58—58, as by the screws 59—59, which supports in turn are secured to or formed integral with the base plate 55, it being understood that said supports 58 are arranged in pairs at opposite ends of the mirror and outside of the periphery of the aperture 56. Also provided on the base plate or panel 55 are four reflecting mirrors 60—60, the same being disposed adjacent the corners of the plate 55, each mirror 60 being disposed at an angle of 45° to vertical and horizontal lines passing through the center of the aperture 56, as clearly shown in Figure 12. At the top and bottom of the plate 55 and midway between the corresponding upper and lower pairs of mirrors 60—60, are two other sets of reflecting mirrors, as indicated at 61—61, the mirrors 61 of each set being at 90° degrees to each other and also disposed at 90° to the respective opposite corner mirrors 60. Four additional reflecting mirrors are also provided as indicated at 62—62, the latter being located adjacent the ends of the mirrors 57 and located opposite the centers of the corresponding corner mirrors 60. As will be seen from the drawings, the surfaces of the mirrors 60 and 61 are all disposed in planes perpendicular to the plane of the plate 55, that is, parallel to the paths of the incident light rays. The other sets of mirrors 57 and 62 are disposed in planes at 45° to the incident beams of light, the mirrors 57—57 facing toward the front of the camera and the mirrors 62 facing toward the rear end of the camera.

Figure 10:
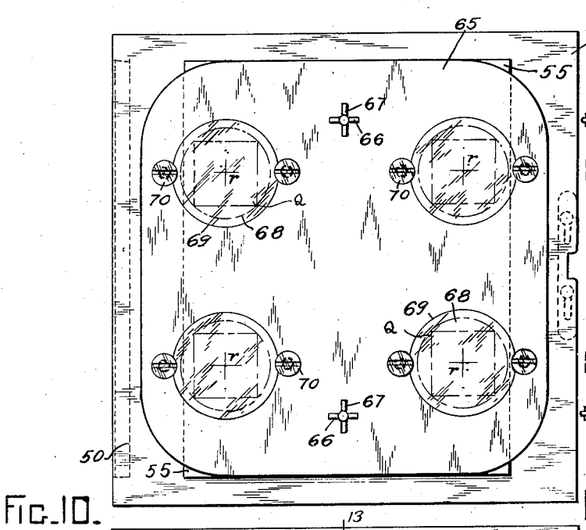
Figure 10 is an inside elevational view of the front wall or partition of the housing showing the optical system and color filter plate or panel as mounted thereon.

With this optical system, images of the object to be photographed will first be cast upon the mirrors 57, as indicated by the arrow $m$ representative of one of such incident image rays or beams. The image striking the mirror 57 is then reflected as indicated by the arrow and dot and dash line $n$ to a mirror 61, thence at right angles, as indicated by the arrow dot and dash line $o$ to a corner mirror 60, then from the latter, as indicated by the arrow dot and dash line $p$ to the corresponding mirror 62 and finally from the latter, as indicated by the arrow $q$ horizontally rearwardly of the camera parallel to the incident beam $m$. As will be apparent from the foregoing with the optical system shown, four separate and like images, are finally projected toward the rear end of the camera in spaced parallel lines, as indicated by the arrows $q$, the same being uniformly spaced around the center of the longitudinal axis of the camera and as clearly indicated by the four crosses $r$—$r$, shown in Figure 10. In this connection, it will be observed that each of the four reflected images traverses equal distances and in like manner, so that the intensity and fidelity of each of the four images, as they leave the optical system, are exactly alike.

The unit assembly optical system carried by the plate 55 is adapted to be readily detachably secured to the inner face of the pivoted front wall 49 in predetermined and registered position by any suitable means, those shown comprising thumb or button latches 63 carried by the wall 49 and adapted to be entered through slots 64—64 in the plate 55. With this construction, it is evident that the optical system assembly can be readily removed and interchanged with others when this is desired for different classes of work, access for this purpose obviously being obtained by unlatching the front wall 49 of the camera housing and swinging it open, thus bringing the optical system where it can be detached or replaced.

Preferably directly and detachably secured to the optical unit assembly is a color filter plate or panel 65 also of generally rectangular outline, said plate being secured in predetermined registered position by similar detachable means comprising the thumb or button latches 66 carried by the optical assembly and entered through slots 67 in the plate 65. The color filter plate 65 is provided with four circular apertures 68—68, each of which is in the path of and centered with respect to a corresponding reflected beam or image $q$. Carried by the plate 65, as shown, are four color filters 69—69, each of which is adapted to be secured over its corresponding opening 68 by suitable means such as the screws 70—70. As apparent from the preceding description, the color filter plates or panels may also be readily detached and attached to provide for interchange, so that the operator may select any desired set of color filters suitable for the particular job being photographed, it being obvious that the filter plate is rendered accessible by swinging open the front wall 49 of the camera main housing 41.

Also disposed within the housing 41, rearwardly of the color filter plate or panel, are the several lenses. The latter, also four in number corresponding to the four separated images reflected from the optical system through the color filters, are indicated conventionally at 71—71 and are mounted on another plate or panel 72, likewise of generally rectangular outline. The plate 72, carrying the lenses, is adapted to be readily detachably secured to a cross-like frame 73 in predetermined registered position by means similar to those previously described in connection with the optical system and color filter plate, such means being indicated at 74—74. To further insure accurate registry of the lenses, the frame 73 is preferably provided with dowel pins 75—75 cooperable with corresponding dowel slots in the lens plate or panel 72. Each of the lenses 71 is of suitable design and each is provided with an adjustable diaphragm as indicated at 76 and, as will further be understood, the several lenses are accurately located so as to register exactly with the four separate images from the optical system. In the case of the lenses, it will be obvious that the lens plate or panel can be readily removed and interchanged with other plates or panels carrying lenses of different focus so as to adapt the camera for different classes of work and different types of negatives or other sensitized elements upon which the images are to be impressed.

In order to render the lenses adjustable toward and from the optical system, the frame 73, as best shown in Figures 4 to 7, is horizontally slidably adjustably mounted on two arms or brackets 77 rigidly associated with the side walls of the main housing 41. The frame 73 is provided with sleeves 78 which telescope over the arms 77 and are adapted to be locked in adjusted position as by the thumb screws 79—79.

From the preceding description, it will be seen that the optical system proper, the color filter plate assembly and the lens plate assembly are all readily accessible for interchange, one or any number thereof, merely by unlatching and swinging open the front wall 49 of the camera main housing 41, thus making it possible for the operator or user to select such optical system or set of color filters or desired focus lenses best suited to the particular work at hand. Furthermore, adjustment is provided for the lenses so as to obtain the best position with reference to the optical system proper and, in addition, by providing adjustable diaphragms on each of the lenses which are readily accessible, the operator can vary the amount of light passing through the color filters and lenses to the sensitive surface to obtain the desired balance one with the other and control the color values photographed upon the single negative or film and thereby obtain optimum quality and reproduction of the several colors of the object photographed. It will further be noted that the construction is such that all parts are sturdily and securely mounted, thus minimizing danger of misplacement or misregister of any of the parts that might otherwise occur in any ordinary handling of the camera and which would otherwise produce distortions or aberrations or other defects in the finished photographs.

Figure 8:
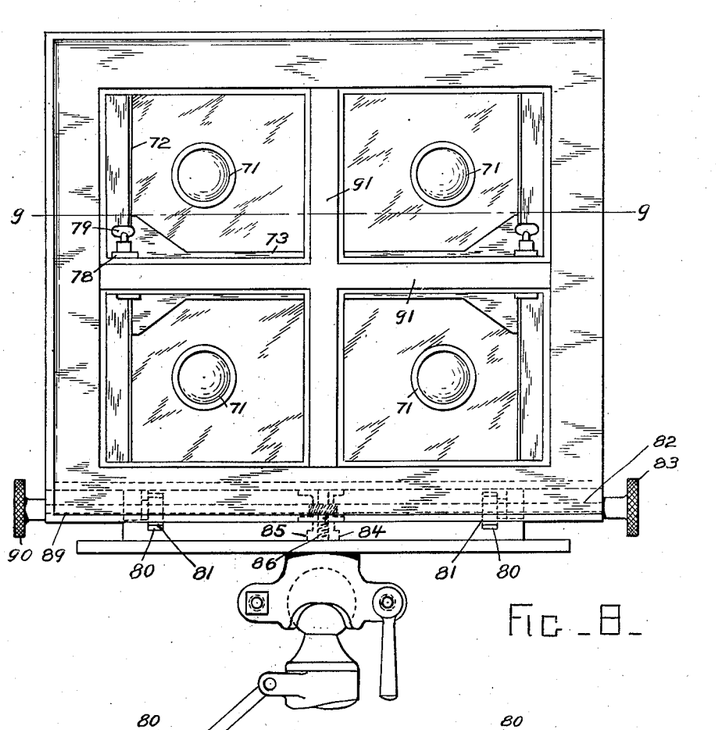
Figure 8 is a rear end elevational view of the camera, but with the negative holder removed.
Figure 9:
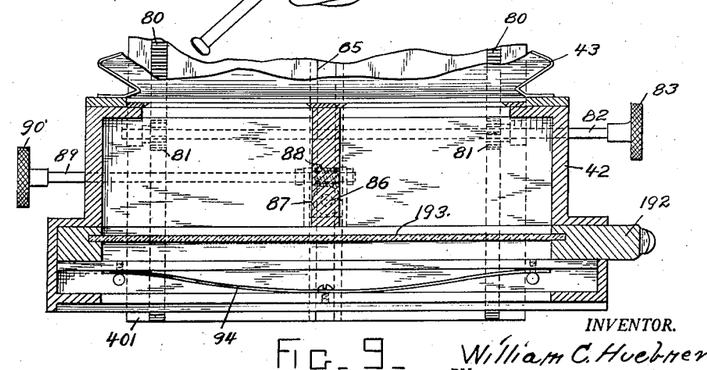
Figure 9 is a horizontal sectional view, corresponding to the section line 9—9 of Figure 8.

Referring now more particularly to Figures 3, 8 and 9, the rear housing 42, of generally rectangular form, is adjustable toward and from the lens assembly on the rearward extension 401 of the bottom member of the camera. This is preferably accomplished by providing extension 401 with racks 80 with which cooperate pinions 81 carried by the transverse shaft 82 and adapted to be manipulated by the knurled nut 83. The housing 42 is then adapted to be locked in any adjusted position as by the clamping nut 84 slidable in a groove 85 of the extension 401, said nut 84 being actuated by a vertical screw 86 having a worm gear 87, in turn actuated by a worm 88 carried by a transverse shaft 89 having knurled nut 90 at the end thereof, as shown in Figure 9.

The housing 42 is preferably provided on the interior thereof with horizontal and vertical partitions 91—91, dividing the same into four similar rectangular areas, said partitions extending parallel to the longitudinal axis of the camera and being provided to prevent side wall reflections or overlapping of the several images projected onto the sensitized plate.

Figure 14:
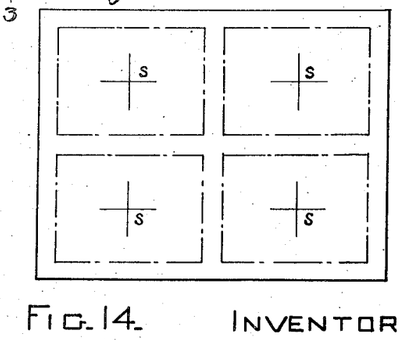
Figures 14 and 15 are diagrammatic views indicating the positions of the impressed images on a negative.
Figure 15:
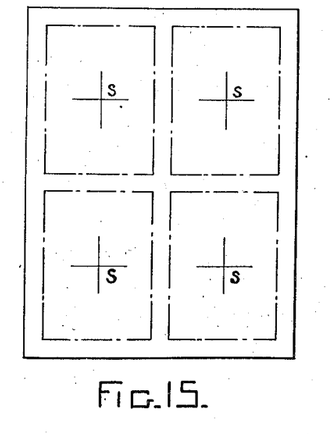

Immediately rearward of the partitions 91, the housing 42 has a side opening through which may be inserted and removed the frame 92 carrying the sensitized element, which, in the instance shown, is a glass negative 93. The negative frame is adapted to be held snug in position by suitable means, such as the spring pressed followers 94—94. As will be understood, a ground glass may be employed in the usual manner for focusing purposes before the negative is inserted. From the preceding description it will be seen that all four color separated images are simultaneously projected and photographically impressed upon the one sensitized surface, as indicated by the four crosses ss in Figures 14 and 15, so that the four images may be developed simultaneously and thereby control the density of the color values of each color separated image in balance with each other.

In color photography, particularly in connection with photomechanical printing processes, it is frequently highly desirable that the operator learn, as soon as possible, the results of the exposures made in order to avoid wasted energy and expense should the negatives not be exactly right as to tone and quality. For this purpose, the present invention provides means in the form of accessories to the camera by which the quality of the work can be readily ascertained, particular reference being had to Figures 16 to 19, inclusive.

Figures 16, 17:
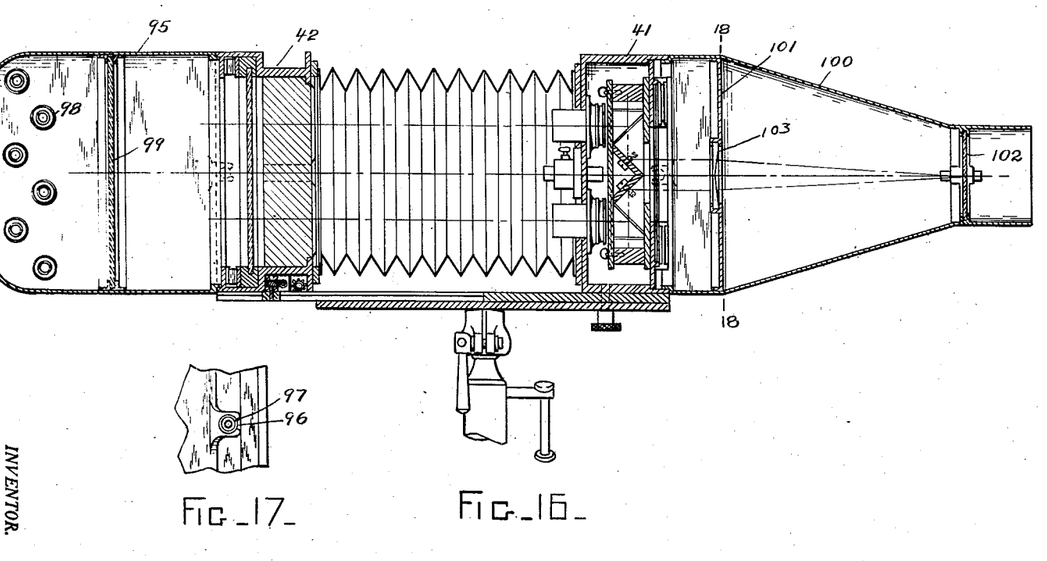
Figure 16 is a view similar to Figure 3, but upon a reduced scale, and illustrating attachments or accessories for the camera for projecting the multiple images on a developed negative in an assembled complete colored reproduction on a ground glass for observation or checking purposes.
Figure 17 is a broken detail view illustrating more particularly the method of attaching the accessories to the camera proper.
Figure 18:
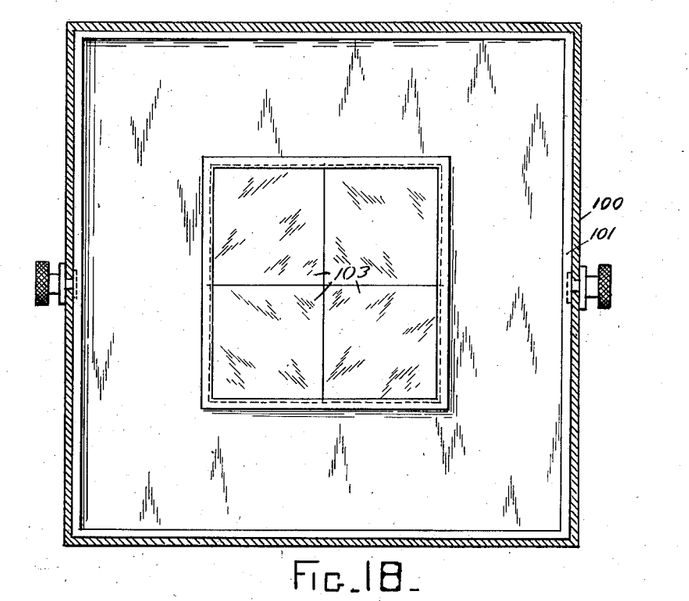
Figure 18 is a vertical cross sectional view, upon an enlarged scale, corresponding to the line 18—18 of Figure 16.

After a plate has been exposed, developed and dried, it may then be reinserted in the camera, as shown in Figure 16. A lamp hood 95 is then attached to the rear housing 42, as by the slotted brackets 96 and thumb screws 97, said lamp hood having preferably a plurality of bulbs 98 therein to provide the necessary source of light. An intermediate light diffusing glass partition 99 may be employed as shown. To the forward end of the camera is detachably secured to the housing 41, an assembling hood 100, the same being detachably secured by similar means. The hood 100 is provided with an intermediate partition 101, carrying assembling wedge lenses, hereinafter described. The hood 100 is tapered forwardly and near its front end is provided with a ground glass 102 which may be viewed from the open front end of the housing 100.

Figure 19:
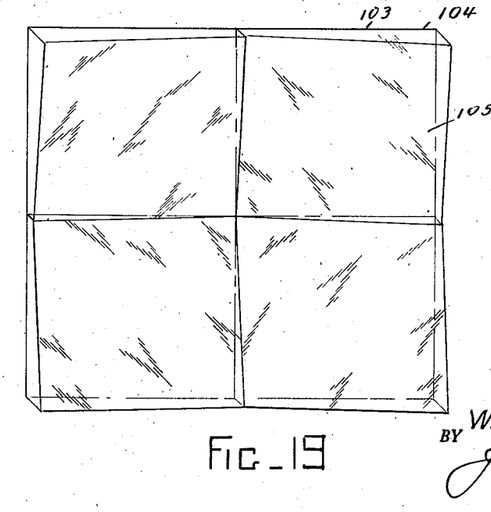
Figure 19 is a perspective view of the multiple wedge lens employed to assemble all of the projected images in register on the ground glass for viewing purposes.

The wedge lens unit, best shown in Figure 19, is centrally mounted in an aperture in the partition 101 and comprises four glass wedges 103—103, symmetrically arranged around the longitudinal axis of the camera. Each of said wedges comprises a flat back face 104 disposed in a plane perpendicular to said axis and a front face 105 which is inclined from an outer corner downwardly to the center, as clearly shown in Figure 19. The angular disposition of the planes of the faces 105 of the wedges are made such that as the four images are transmitted through the wedge lenses, the angle of refraction will converge all four images in register and superposed on the ground glass 102. As will be understood, the light at the rear end of the camera will transmit the four images first to the respective lenses 71, thence through the color filters and through the optical system in the opposite manner to that in which the images were first received and projected onto the negative. In this connection, it will be understood that the color filters are changed from those originally used in obtaining the negative so as to substitute the complemental color filters when projecting the images onto the ground glass 102. In this manner, the operator is enabled to view a complete full color in focus in one image and thereby ascertain immediately the complete color result.

Figure 20:
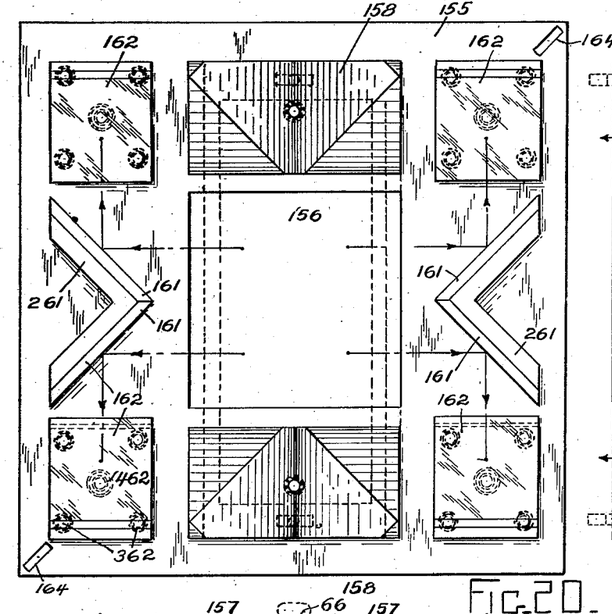
Figure 20 is an inside elevational view of a modified optical system.
Figure 21:
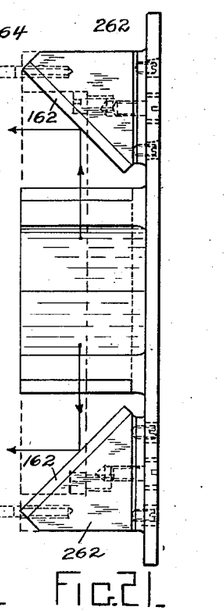
Figures 21 and 22 are side and bottom elevational views, respectively, of the optical system shown in Figure 20.
Figure 22:
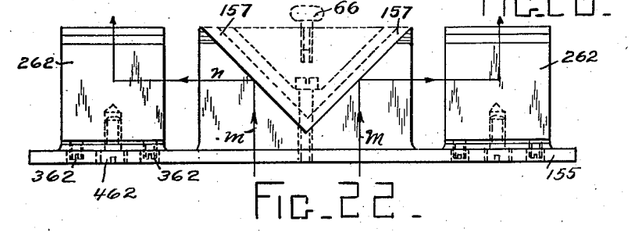

Referring next to the modified optical system shown in Figures 20, 21 and 22. In this modification, the unit optical assembly on the plate 155 is similar to that previously shown and described in connection with Figures 10 to 13, except that fewer mirrors are employed and certain details of refinement for insuring accuracy of position of the mirrors are illustrated. On the plate 155 are provided two V-shaped supports 158—158 at opposite sides of the central aperture 156. Secured in position in said supports 158 are two mirrors 157—157, disposed at right angles to each other and each at an angle of 45° to the incident light rays or beams. On opposite sides of the mirrors 157 are two sets of mirrors 161, 161, the mirrors of each set being at 90° to each other and the line of junction of the mirrors being disposed at right angles to the line of junction of the incident mirrors 157—157, as shown. The mirrors 161 are preferably applied to flanges 261 made integral with the plate 155. At the four corners of the plate 155 are four other mirrors 162—162, each of the latter being mounted on a triangular block 262. As will be seen from the drawings, the planes of the mirrors 161, are parallel to the incident beams of light, whereas the planes of the mirrors 162 are at 45° to said incident beams of light and faced toward the rear as in the case of the mirrors 62 of the first described optical system. In the modified system, the image first strikes the mirror 157, is then reflected to a corresponding mirror 161 and from the latter to the corresponding corner mirror 162 and from the latter finally rearwardly and parallel to the incident beam, thus providing the four separated images, as heretofore described.

In order to obtain extreme accuracy of the finally projected four images and to reduce manufacturing costs, the four corner blocks 262 are made finely adjustable. This is preferably accomplished by employing four adjusting screws 362 threaded in the plate 155 and engageable with the four corners of the block 262. By suitably manipulating the screws 362, it will be obvious that the desired angle of the mirror 162 may be obtained and, when obtained, the block 262 is then securely locked in adjusted position by tightening up the pull screw 462 swivelled in the plate 155 and threaded in the block 262.

Figure 23:
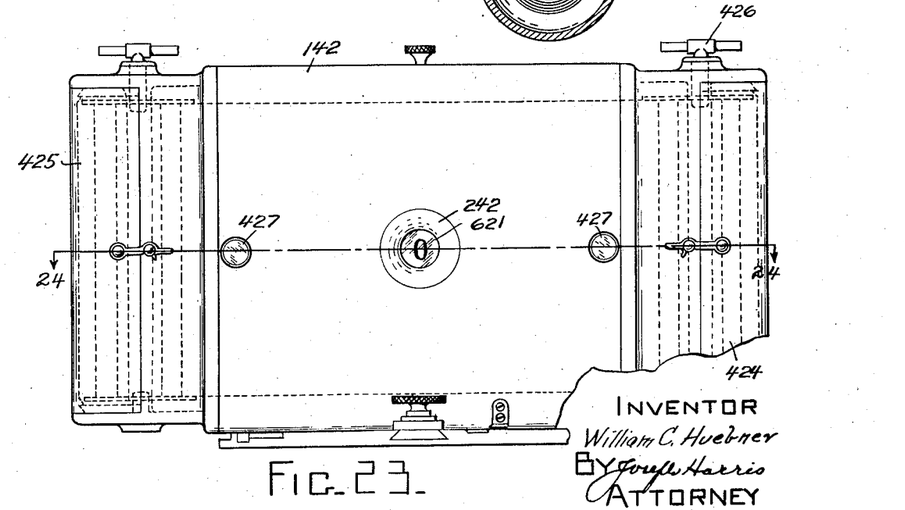
Figure 23 is a rear end elevational view of the camera showing the same modified to use a roll of film.
Figure 24:
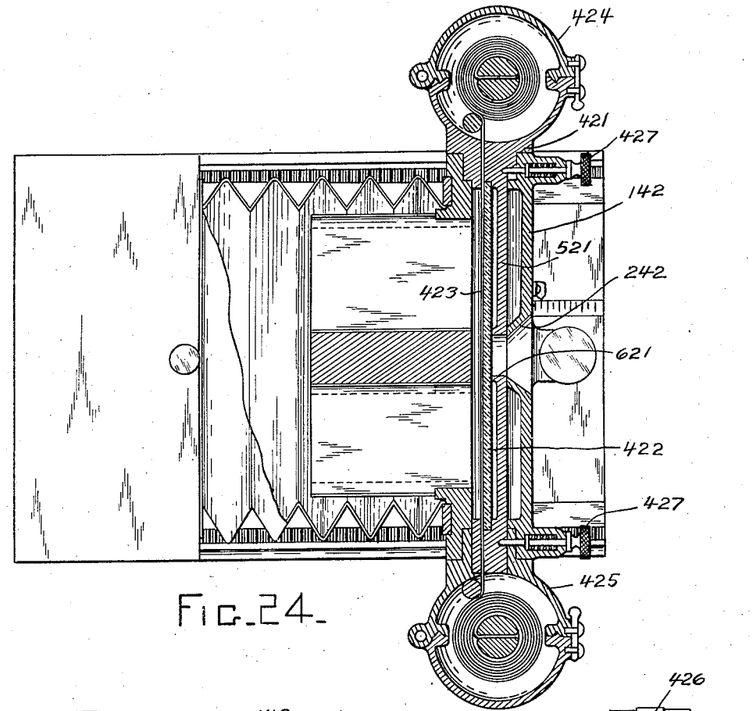
Figure 24 is a horizontal sectional view corresponding to the section line 24—24 of Figure 23.
Figure 25:
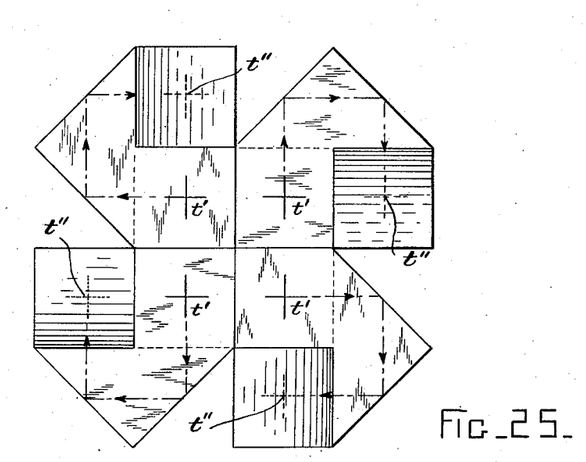
Figure 25 is a front elevational view of a modified optical system utilizing prisms.

Although in the preceding description, the camera has been described as utilizing a glass negative, it will be understood by those skilled in the art that films or other suitable sensitized elements may be employed. In Figures 23 and 24, the camera is shown with a modification employing a roll of films. For this purpose, the rear housing of the camera is modified to provide a back wall 142 having a central sight opening 242 and transversely slotted to detachably receive therein a film supporting member 421 having a transverse partition 521 with a sight opening 621 alined with the opening 242, and carrying also a glass backing plate 422 for the film 423 stretched thereacross. At one end, the plate 421 is provided with a cylindrical film roll holder 424, the cylinder being made in hinged sections so that the same may be readily opened for loading and unloading. At the opposite side, a second cylindrical film roll holder 425 is employed, adapted to telescope over the end of the plate 421 and into a corresponding recess provided in the housing 142. The holder 425 is preferably made of hinged cylindrical sections so as to provide access for loading and unloading, as will be understood. The film is adapted to be wound on one roll and unwound from the other by the usual spools adapted to be detachably held in place by the spring pressed latches 427—427, as shown.

Figures 26, 27, 28, 29, 30:
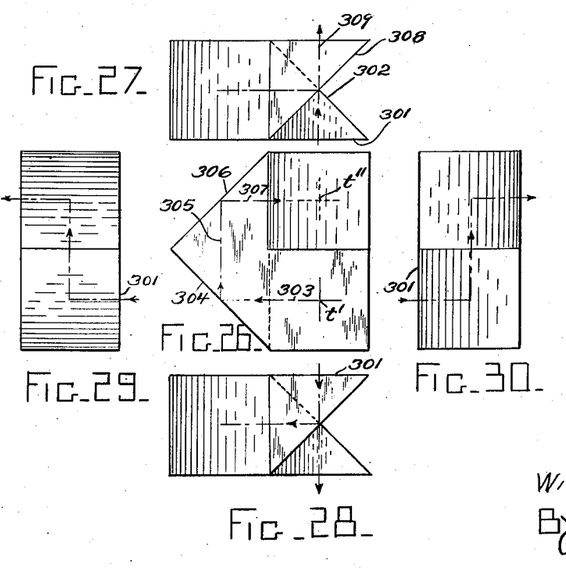
Figures 26 to 31, both inclusive, are detail views illustrating one of the prisms used in the optical system of Figure 25.
Figure 31:
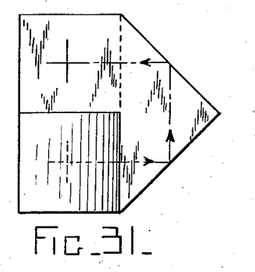

In most instances, the mirror reflecting optical systems will be found most desirable for fine quality work, since it minimizes danger of so called "ghost" images being produced in the transmission of the images of the sensitized surfaces. In certain classes of work, however, it may be found desirable to use optical systems employing prisms and one such system, where four color separation images are desired, is shown in Figures 25 to 31. As there shown, the optical system employs four prism structures arranged in contact with each other and symmetrically about a center point which would lie in the longitudinal central axis of the camera. Each of said prism structures is of like construction and a detail description of one will suffice. The one shown in detail in Figures 26 to 31 and to which specific description will be applied, is the upper left hand prism shown in Figure 25. Each said prism has a flat incident face 301 on which the image of the object is received as indicated by the cross $t$, said face being perpendicular to the incident beam. Directly rearwardly of the face 301, the prism is provided with a reflecting face 302 at 45° thereto and from which the image is reflected as indicated by the arrow dot and dash line 303 to another reflecting face or surface 304, arranged at 45° to the horizontal, as shown in Figure 26. From the face 304, the image is reflected, as indicated by the arrow dot and dash line 305 to another reflecting surface 306 disposed at right angles to the surface 304. From the surface 306, the image is again reflected, as indicated by the arrow dot and dash line 307 to a reflecting surface 308 which is at right angles to the surface 302, but disposed above the same and from which in turn the image is reflected, as indicated by the arrow dot and dash line 309 rearwardly and in a direction parallel to the incident beam, but vertically spaced thereabove, as viewed in Figure 26, and as indicated by the dotted cross $t'$. Similarly, the images striking the incident faces of the other three prisms will be ultimately transmitted at the places indicated by the other three dotted crosses in Figure 25 and referenced $t''$.

Figure 32:
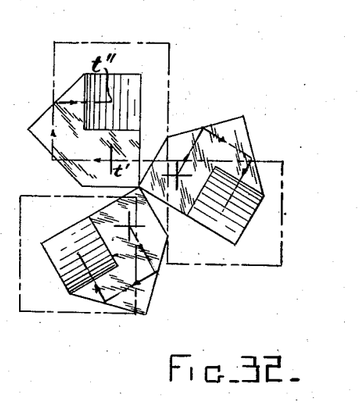
Figures 32, 33 and 34 are views similar to Figure 25, illustrating prism type optical systems for obtaining three, six and five separated images, respectively.
Figure 33:
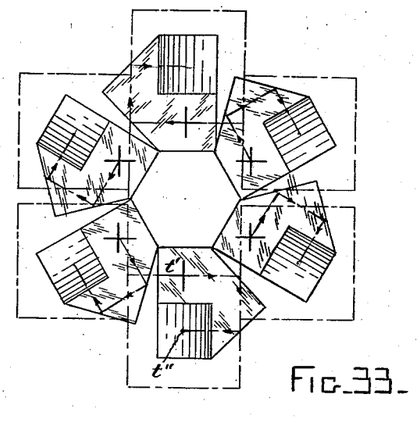
Figure 34:
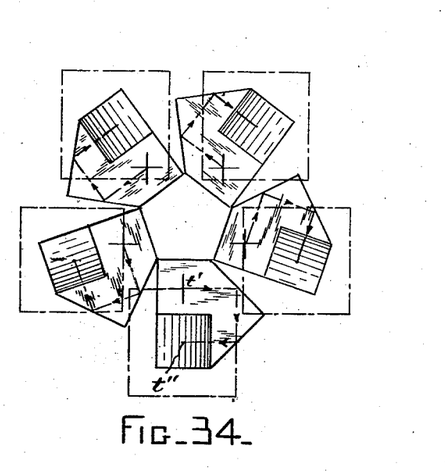

In the previously described forms of the invention, the optical systems and associated parts have all been arranged to provide for four color separation. In certain classes of work, particularly in connection with photomechanical printing processes, it may be desirable to use a greater or lesser number of color separations and in Figures 32, 33 and 34 are shown prism arrangements similar to those shown in Figures 25 to 31, but providing for three color separation in Figure 32; six color separation in Figure 33; and five color separation in Figure 34. In each of Figures 32, 33 and 34, the prisms which are of like construction to those previously described in detail, are all symmetrically arranged around a center point, but in the case of those using five or six prisms, the same necessarily are somewhat spaced from the center point, as shown.

Figures 35, 36, 37:
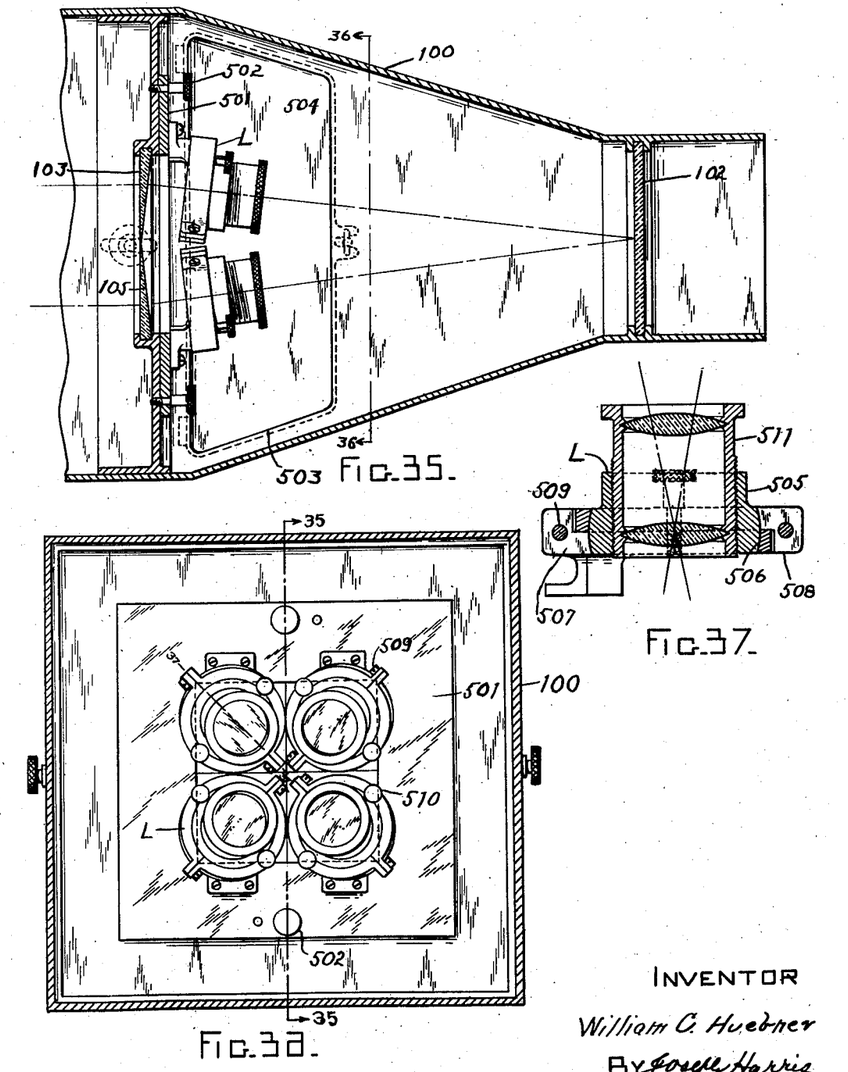
Figure 35 is another view corresponding to Figure 16, illustrating another arrangement for projecting images for observation purposes, and corresponds to the section line 35—35 of Figure 36.
Figure 36 is a vertical sectional view corresponding substantially to section line 36—36 of Figure 35 and upon a somewhat larger scale.
Figure 37 is a detail longitudinal sectional view of one of the lenses shown in Figures 35 and 36 and corresponding to the section line 37—37 of Figure 36.

Referring next to the construction illustrated in Figures 35, 36 and 37. In many cases involving particularly fine work, it will be desirable to provide more refined means of determining the results of an exposure than is possible with the accessories shown in Figures 16, 18 and 19 for that purpose and heretofore described. The improved means for this purpose are shown in Figures 35, 36 and 37 where, in addition to the wedge lens 103, there are provided four focusing lenses each of which is designated generally by the reference character L. The number of lenses L will correspond to the number of color separations, all of said lenses being mounted on a plate 501 adapted to be detachably secured to the partition 101 of the hood 100, as by means of thumb screws 502. The plate 501 with the lenses mounted thereon may be inserted within the hood 100 through the opening 503 which is normally closed by the pivoted door or flap 504.

As will be understood, each of the lenses L occupies a position directly in front of a corresponding inclined wedge lens face 105, previously described, and all the lenses L are made uniformly adjustable so that the images may be brought into register on the ground glass 102.

To provide for the necessary adjustment and focusing, the construction shown best in detail in Figure 37 is preferably employed. Each lens L includes a lens ring 505 having an annular spherical surface 506 which is received within a split or two part clamping ring comprised of the sections 507 and 508 which have complemental surfaces engaging the annular spherical section 506 of the lens ring 505. The clamping ring sections 507 and 508 are retained in assembled position by suitable set screws 509—509. The lens is held in angularly adjusted position within the clamping ring by two diametrically disposed set screws 510—510. In order to obtain the proper focus of each lens, the lens barrel 511 is threaded within the lens ring 505 so that the lenses may be adjusted axially, as will be apparent. In use, the lenses L will first each be manipulated by hand so as to direct the axes of all of the lenses to converge at a common point on the ground glass 102. When the proper axial dispositions of the lenses has been obtained, they are then set and locked in such position by tightening up the screws 510. The proper focusing is then obtained by rotating the lens barrels 511, as will be obvious.

Although the image assembling devices shown in Figures 16, 35, 36 and 37 are illustrated in connection with the camera, it will be apparent that such image assembling accessories may be employed with other projecting systems, should it be found desirable to utilize the camera proper continuously for making of the color separation negatives and not tie the same up when checking negatives which have been developed.

Although there has herein been shown and described what is now considered the preferred manner of carrying out the invention, the same is by way of illustration only and not by way of limitation. All changes and modifications are contemplated that come within the scope of the claims appended hereto.

What is claimed is:

1. A camera of the character described, comprising: a housing including a front wall displaceable from operative position to an inoperative position to thereby provide access to the interior of the housing; an optical system for simultaneously producing a plurality of like images of an object and projecting said images in separated parallel paths; means detachably securing said optical system to the inner side of said wall; a single plate having a plurality of color filters secured thereto; detachable means for mounting said plate and said filters as a unitary assembly on the inner side of said wall inwardly of the optical system with the color filters in the paths of the projected images; a second plate having a plurality of lenses mounted thereon, the lenses being disposed in the paths of the projected images inwardly of the color filters; means detachably securing said lens supporting plate with the lenses thereon as a unitary assembly to the interior of the housing, whereby said optical system, the filter supporting plate assembly and the lens supporting plate assembly may any or all be interchanged for others; and means for supporting a sensitized element disposed in the paths of all of the images transmitted from the lenses.

2. In a camera of the character described, the combination with a housing; of a centrally apertured front wall in the housing, said wall being movable from an operative position to an inoperative position to permit access to parts within the housing; a shutter for controlling admission of light through the aperture of said wall; a multiple image-reflecting optical system including a base plate on which all of the elements of the system are mounted to constitute an assembled unit; means detachably securing said base plate to the inner side of said wall and in alinement with the aperture thereof whereby said optical system may be removed as a unit from said front wall and interchanged for other assembled optical system units; a plate having means for retaining thereon a plurality of color filters; means detachably securing said filter-holding plate to the optical system assembly whereby said filter-holding plate may be interchanged for others with different sets of color filters without removal of the optical system; a second plate disposed inwardly of the color filter plate and having a plurality of lenses mounted thereon; means detachably and slidably connecting said lens plate to the interior of the housing whereby the lenses may be adjusted toward and from the optical system; and means for supporting a sensitized element positioned to be photographically impressed by the images transmitted thereto from the lenses.

3. A camera according to claim 2, wherein each of said lenses is provided with an adjustable diaphragm.

4. A camera of the character described, comprising: a front housing having a pivoted front wall to provide access to the interior thereof, said wall having an aperture and adjustable diaphragm therefor; a centrally apertured plate detachably mounted on the inner side of said front wall, said plate having mounted thereon and removable as an assembled unit therewith a mirror optical system for simultaneously producing a plurality of like images of an object transmitted through the aperture of the plate and projecting said images in separated parallel paths; a second plate detachably mounted on the first named plate and having mounted thereon a plurality of color filters, said second plate and filters being detachable as an assembled unit from said first named plate; a third plate detachably mounted within said front housing and having mounted thereon a plurality of focusing lenses each provided with an adjustable diaphragm; a rear housing having means therein for supporting a sensitized element, said rear housing being provided with a pluarlity of partitions located adjacent and in front of the sensitized element to divide said rear housing into a plurality of chambers corresponding to the number of separated images; a bellows connecting said front and rear housings; and means for adjusting the housings relatively toward and from each other.

5. A camera of the character described, comprising: a housing including a closure wall displaceable from operative to inoperative position to thereby provide access to the interior of the housing; an optical system within the housing for simultaneously producing a plurality of like images of an object and projecting said images in separated parallel paths; a plurality of color filters detachably mounted within the housing; an apertured frame slidably mounted within the housing to move back and forth parallel to the axis of the camera; a plate detachably secured to said frame, said plate having secured thereto a plurality of lenses corresponding to the number of said produced images, each of said lenses being provided with an adjustable diaphragm, said lens plate with the lenses thereon being accessible for removal from the housing as an assembled unit or the several lens diaphragms for separate independent adjustment for light transmission control when said closure wall of the housing is moved to inoperative position; and means for supporting a sensitized element in the paths of the several images transmitted through the lenses.

WILLIAM C. HUEBNER.